(12) United States Patent
Ezawa

(10) Patent No.: US 9,995,988 B2
(45) Date of Patent: Jun. 12, 2018

(54) SHAKE CORRECTION APPARATUS

(71) Applicant: OLYMPUS CORPORATION, Hachioji-shi, Tokyo (JP)

(72) Inventor: Hiroshi Ezawa, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 15/656,715

(22) Filed: Jul. 21, 2017

(65) Prior Publication Data

US 2017/0322475 A1 Nov. 9, 2017

Related U.S. Application Data

(63) Continuation of application No. PCT/JP2015/074123, filed on Aug. 26, 2015.

(30) Foreign Application Priority Data

Mar. 13, 2015 (JP) .................................. 2015-051126

(51) Int. Cl.
*G03B 5/00* (2006.01)
*H04N 5/232* (2006.01)
*G02B 27/64* (2006.01)

(52) U.S. Cl.
CPC .............. *G03B 5/00* (2013.01); *G02B 27/64* (2013.01); *G02B 27/646* (2013.01); *H04N 5/23264* (2013.01); *G03B 2205/0069* (2013.01)

(58) Field of Classification Search
None
See application file for complete search history.

(56) References Cited

U.S. PATENT DOCUMENTS

2007/0263996 A1* 11/2007 Iwasaki ................ G02B 27/646
396/55
2012/0082442 A1* 4/2012 Kwon .................. G02B 27/646
396/55

(Continued)

FOREIGN PATENT DOCUMENTS

JP 2008170838 A 7/2008
JP 2008292900 A 12/2008

(Continued)

OTHER PUBLICATIONS

English translation of the International Preliminary Report on Patentability (IPRP) dated Sep. 28, 2017 issued in counterpart International Application No. PCT/JP2015/074123.

(Continued)

*Primary Examiner* — WB Perkey
(74) *Attorney, Agent, or Firm* — Holtz, Holtz & Volek PC

(57) ABSTRACT

A shake correction apparatus includes: a stationary portion (21) having coils (22S, 22L, 23S, 23L, 24S, 24L) arranged; a movable portion including magnets (52a, 52b, 52c, 52d, 53a, 53b, 53c, 53d, 54a, 54b, 54c, 54d) opposed to the coils and an imaging element; a supporting member for movably supporting the movable portion to the stationary portion along a plane orthogonal to an optical axis of light entering into the imaging element; means for detecting a position of the movable portion; and means for controlling current flowed into the coils based on output of the detection means, the coils including at least three coil pairs when two coils opposed to each other along the plane orthogonal to the optical axis are paired, driving forces of two coils forming each coil pair being different.

8 Claims, 8 Drawing Sheets

(56) References Cited

U.S. PATENT DOCUMENTS

| | | | |
|---|---|---|---|
| 2012/0127576 A1 | 5/2012 | Tanaka | |
| 2016/0266381 A1* | 9/2016 | Honsho | G03B 5/00 |
| 2017/0045753 A1* | 2/2017 | Enta | G02B 7/04 |
| 2017/0090148 A1* | 3/2017 | Park | G02B 7/08 |
| 2017/0322475 A1* | 11/2017 | Ezawa | G03B 5/00 |

FOREIGN PATENT DOCUMENTS

| | | |
|---|---|---|
| JP | 2012108399 A | 6/2012 |
| JP | 2014081432 A | 5/2014 |

OTHER PUBLICATIONS

International Search Report (ISR) and Written Opinion dated Nov. 17, 2015 issued in International Application No. PCT/JP2015/074123.

* cited by examiner

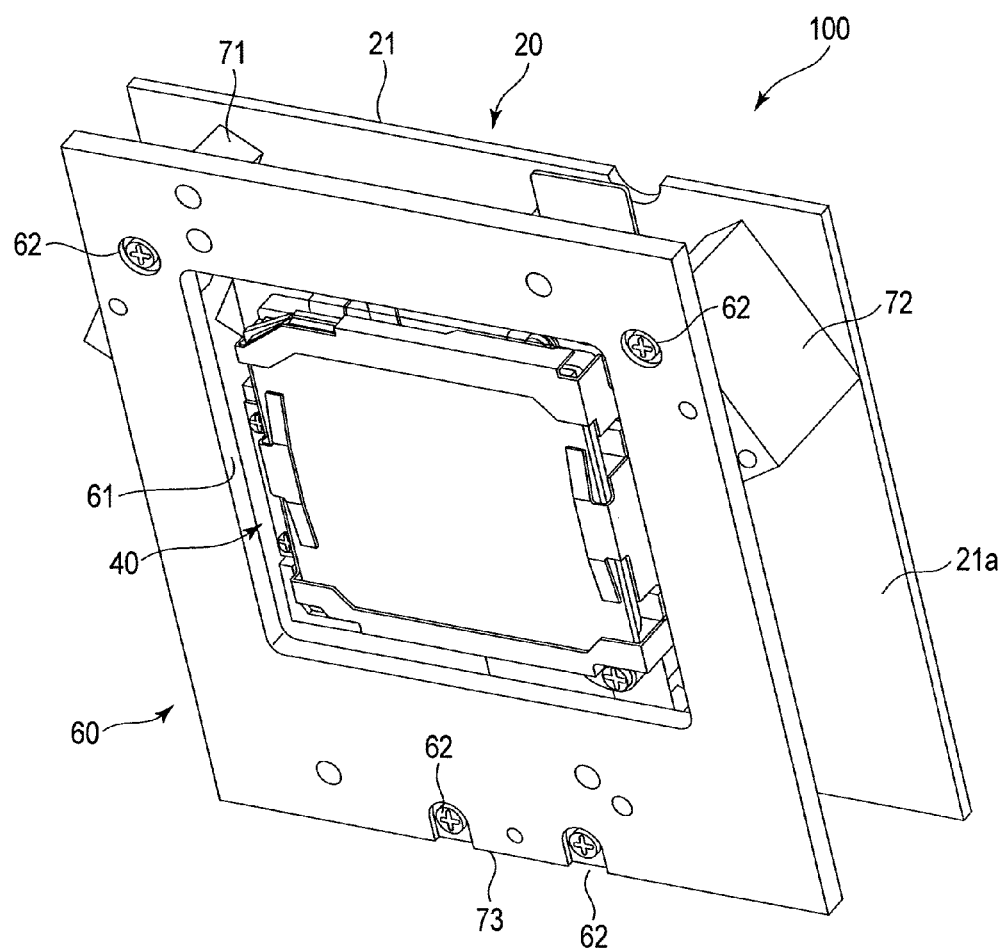
F I G. 1

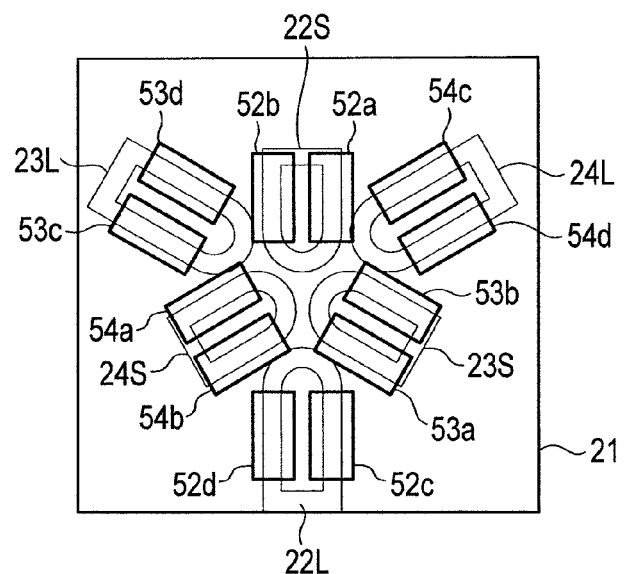
F I G. 7
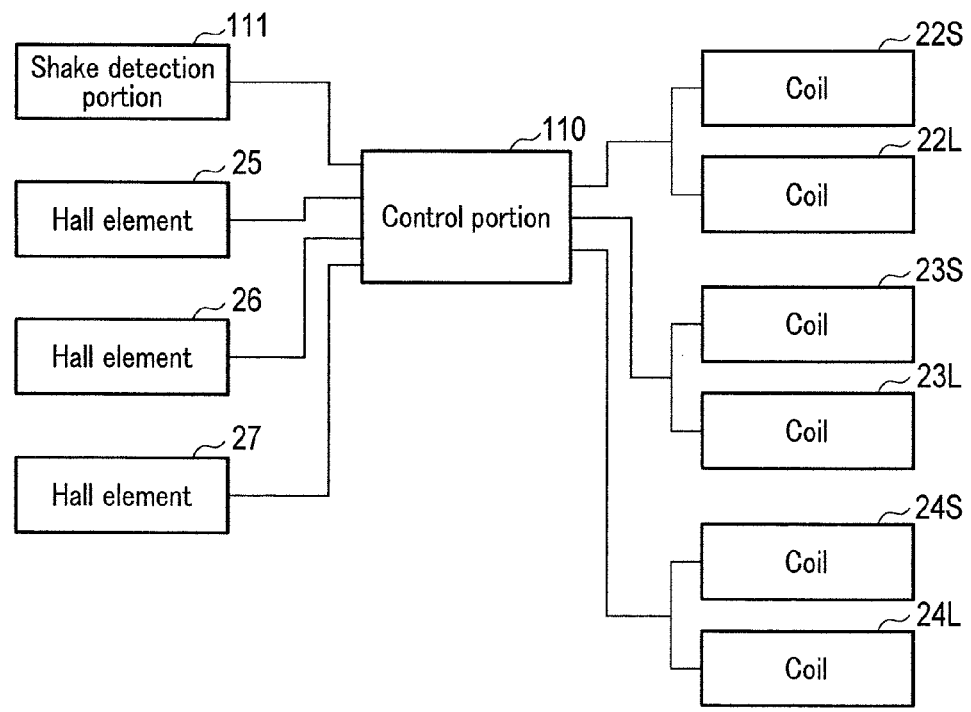
F I G. 8

SHAKE CORRECTION APPARATUS

CROSS REFERENCE TO RELATED APPLICATIONS

This application is a Continuation application of PCT Application No. PCT/JP2015/074123, filed Aug. 26, 2015 and based upon and claiming the benefit of priority from Japanese Patent Application No. 2015-051126, filed Mar. 13, 2015, the entire contents of all of which are incorporated herein by reference.

FIELD

The present invention relates to a shake correction apparatus for correcting, for example, a camera shake.

BACKGROUND

Conventionally, an apparatus in which a movable portion that holds a lens is moved using three driving portions (for example, Jpn. Pat. Appln. KOKAI Publication No. 2012-108399), is, for example, known as a shake correction apparatus for correcting a camera shake. The three driving portions are voice coil motors (VCMs) and are each arranged outside of the effective diameter of a lens.

With three driving portions arranged outside of a lens, an apparatus is increased in size along a plane orthogonal to the optical axis, and it becomes difficult to reduce the size of a camera.

SUMMARY

The present invention has been made in consideration of the above, and is intended to provide a shake correction apparatus that enables size reduction.

According to one aspect of the invention, a shake correction apparatus comprises: a stationary portion on which a plurality of coils are arranged; a movable portion that includes a plurality of magnets arranged to be opposed to the coils, and an optical element or an imaging element; a supporting member for movably supporting the movable portion with respect to the stationary portion along a plane orthogonal to an optical axis of light entering into the optical element or the imaging element; detection means for detecting a position of the movable portion; and control means for controlling a current to be flowed into the coils based on an output of the detection means, wherein the coils include at least three coil pairs when two coils that are arranged to be opposed to each other along the plane orthogonal to the optical axis are paired as one coil pair, and wherein in each of the coil pairs, driving forces of two coils forming each of the coil pairs are different from each other.

According to another aspect of the invention, the detection means is arranged on an inside of one coil that is smaller in driving force than another coil of the two coils forming each of the at least three coil pairs.

According to another aspect of the invention, a predetermined position of the stationary portion is located between the two coils forming each of the coil pairs, and the coils are arranged in a manner to radiate from the predetermined position as a center.

According to another aspect of the invention, in the at least three coil pairs, ends of coils on a side of the predetermined position of the stationary portion are bent in an arc shape, and the ends in the arc shape face each other.

According to another aspect of the invention, each of the coils is assigned with two opposed magnets, and the two magnets are arranged to face each other along the plane orthogonal to the optical axis.

According to another aspect of the invention, the shake correction apparatus further comprises a lid member that is attached to the stationary portion and is arranged in such a position that the movable portion is pinched between the lid member and the stationary portion, wherein the stationary portion is formed from a magnetic member, and wherein the movable portion is attached to the stationary portion by magnetic forces of the magnets through the supporting member.

According to another aspect of the invention, the shake correction apparatus further comprises a plurality of pillars that attach the lid member to the stationary portion outside a moving region of the movable portion, wherein each of the pillars includes an abutting surface that defines the moving region of the movable portion by bring the movable portion in abutment.

According to another aspect of the invention, the movable portion is provided with the imaging element, and the imaging element is attached to the movable portion in a manner wherein at least a part of the magnets overlaps the imaging element in a direction of an optical axis of light entering into the imaging element.

According to the present invention, it is possible to provide a shake correction apparatus that enables size reduction.

BRIEF DESCRIPTION OF THE DRAWINGS

FIG. 1 is a perspective view showing a shake correction apparatus according to an embodiment of the present invention.

FIG. 7 is a schematic diagram showing a state where magnets shown in FIG. 5 are stacked on coils shown in FIG. 4.

FIG. 8 is a block diagram of a control system that controls operation of the shake correction apparatus shown in FIG. 1.

DETAILED DESCRIPTION

Embodiments will now be described with reference to the accompanying drawings.

Figure 2:
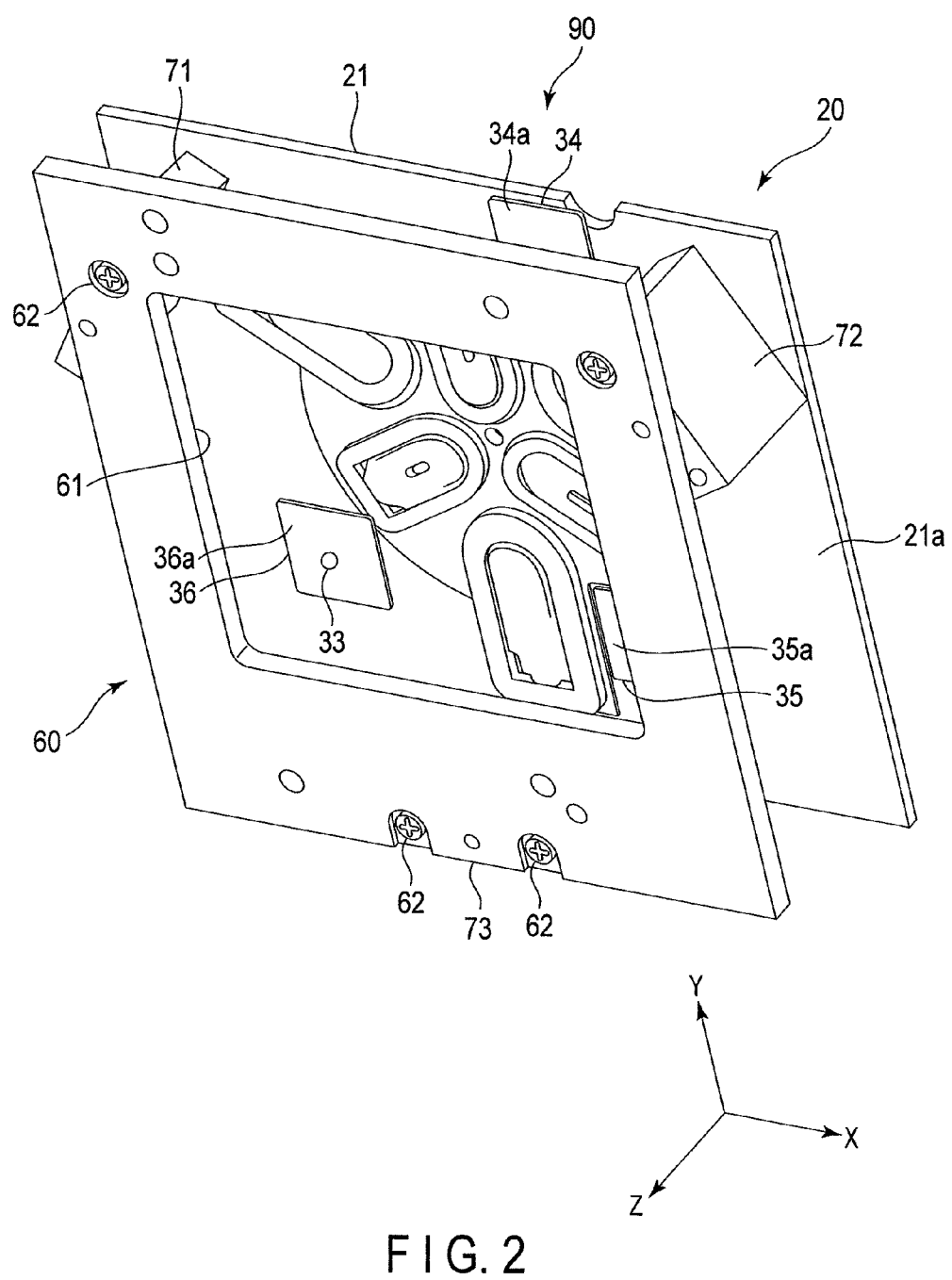
FIG. 2 is a perspective view showing an assembly formed by assembling a stationary portion, a lid member, and pillars of the shake correction apparatus shown in FIG. 1.
Figure 3:
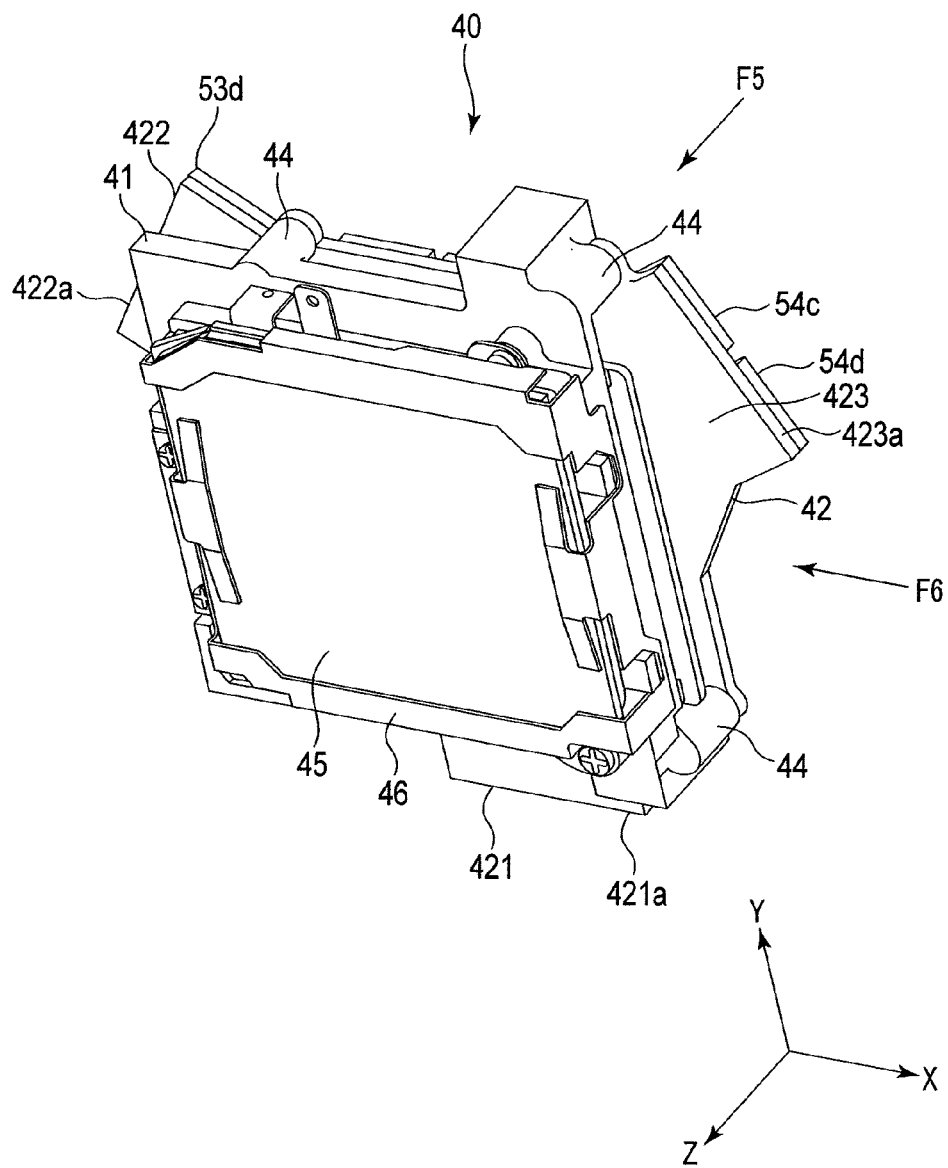
FIG. 3 is a perspective view showing a movable portion arranged between the stationary portion and the lid member shown in FIG. 2.

FIG. 1 is a perspective view showing a shake correction apparatus 100 according to an embodiment of the present invention. FIG. 2 is a perspective view showing an assembly 90 formed by assembling a stationary portion 20, a lid member 60, and three pillars 71, 72, and 73 of the shake correction apparatus 100. FIG. 3 is a perspective view showing a movable portion 40 arranged between the stationary portion 20 and the lid member 60 of the assembly 90. This shake correction apparatus 100 is an apparatus to be incorporated in, for example, a camera, not shown, to correct a shake caused by a photographer's hands.

In the following description, the horizontal axis that passes through the optical axis of a camera and is parallel to an imaging surface 1a of an imaging element 1 (optical element), to be described later, of the shake correction apparatus 100, is referred to as an X-axis. The vertical axis that passes through the optical axis is parallel to the imaging surface 1a, is orthogonal to the X-axis, and is referred to as a Y-axis. The axis that is orthogonal to the X-axis and the Y-axis, that is, the axis corresponding to the optical axis of the camera is referred to as a Z-axis. The front direction in the drawings that extends along the Z-axis is referred to as a front, and the reverse direction is referred to as a rear.

Figure 4:
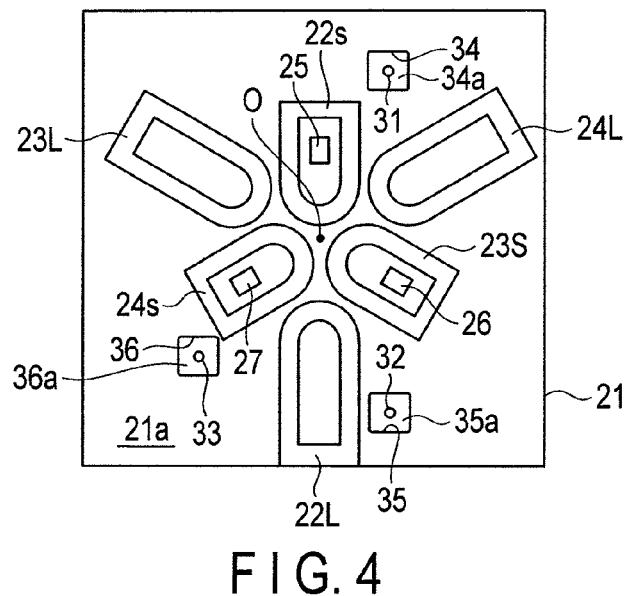
FIG. 4 is a plane view of the stationary portion in the assembly shown in FIG. 2 as viewed from the front.

As shown in FIG. 2, the stationary portion 20 of the shake correction apparatus 100 includes a rectangular-plate shaped base member 21 to be attached to a camera in a position perpendicular to the optical axis and parallel to the X-Y plane. The base member 21 is formed from a magnetic member such as SUS304, for example. FIG. 4 is a plane view of the base member 21 as viewed from the front. As shown in FIGS. 2 and 4, six coils 22S, 22L, 23S, 23L, 24S, and 24L that are arranged in a manner to radiate from a position O (predetermined position) crossing the optical axis, are attached to a front surface 21a of the base member 21.

Among all the six coils 22S, 22L, 23S, 23L, 24S, and 24L, the relatively-small three coils 22S, 23S, and 24S are arranged on the inside close to the position O, while the relatively-large three coils 22L, 23L, and 24L are arranged on the outside at some distance from the position O. The coils are arranged in a manner wherein the three large coils are shifted mutually by 120 degrees and the three small coils are shifted mutually by 120 degrees.

In other words, the six coils 22S, 22L, 23S, 23L, 24S, and 24L are arranged close to the position O in a manner that the large coils 22L, 23L, and 24L on the outside are partially interposed between the small coils 22S, 23S, and 24S on the inside. Therefore, in each of the coils, the end close to the position O is rounded to be bent in an arc shape. In this manner, an apparatus can be reduced in size by bringing each of the coils 22S, 22L, 23S, 23L, 24S, and 24L as close as possible to the position O.

In a different perspective, if two coils of a large coil and a small coil (for example, 22S and 22L) that are opposed to each other across the position O are paired, the six coils 22S, 22L, 23S, 23L, 24S, and 24L include three coil pairs 22 (22S and 22L), 23 (23S and 23L), and 24 (24S and 24L). In each of the coil pairs 22, 23, and 24, a distance from the apexes of the arc-shaped ends of the large coils 22L, 23L, 24L to the position O is greater than a distance from the apexes of the arch-shaped ends of the small coils 22S, 23S, and 24S to the position O. The winding number of the large coils 22L, 23L, and 24L is made larger than the winding number of the small coils 22S, 23S, and 24S.

In the coil pairs 22, 23, and 24, Hall elements 25, 26, and 27 (detection means) are arranged on the inside of the coils 22S, 23S, and 24S that are smaller (in driving force), respectively. The Hall elements 25, 26, and 27 detect a position of the movable portion 40 along the X-Y plane with respect to the stationary portion 20 by detecting magnetic forces from opposed magnets 52a, 52b, 53a, 53b, 54a, and 54b (see FIG. 5). At this time, however, there is also an influence of magnetic forces from the coils, and these magnetic forces from the coils interfere with detection of a correct position. In this embodiment, therefore, the Hall elements 25, 26, and 27 are arranged within the small coils 22S, 23S, and 24S that have the smaller winding number and give less influence of magnetic forces than the large coils 22L, 23L, and 24L.

Other than the above, methods for reducing noise of a detection signal by the Hall elements 25, 26, and 27 include, for example, arranging a Hall element in a coil having therein a relatively-large hollow portion, arranging a Hall element in a position closer to a magnet than to a coil, and arranging a Hall element in a coil that is thinner than the Hall element.

The front surface 21a of the base member 21 is provided with three concave portions 34, 35, and 36 in a substantially rectangular shape, for housing and arranging therein three balls 31, 32, and 33 (supporting members) to be described later, respectively. These three concave portions 34, 35, and 36 are provided in positions different from the six coils 22S, 22L, 23S, 23L, 24S, and 24L described above, and are arranged apart from each other in good balance. Ball receiving plates 34a, 35a, and 36a made of, for example, stainless steel for preventing friction of the base member 21, are stuck on the bottom surfaces of the concave portions 34, 35, and 36, which come in slide-contact with the balls 31, 32, and 33.

The lid member 60 in a rectangular frame shape is arranged in front of the base member 21 with a space therebetween.

As shown in FIGS. 1 and 2, the lid member 60 includes a relatively-large rectangular opening 61 having a size of surrounding a moving range of the movable portion 40. In other words, this opening 61 is shaped and sized so that the front surface of the movable portion 40 is exposed.

Three pillars 71, 72, and 73 are arranged between the lid member 60 and the base member 21. Each of the pillars 71, 72, and 73 is formed in a square pillar shape. Each of the pillars 71, 72, and 73 has one end fastened and secured to the base member 21 by means of a screw, not shown. Each of the pillars 71, 72, and 73 has the other end fastened and secured to the lid member 60 by means of screws 62. The pillars 71, 72, and 73 have inner surfaces 71a, 72a, and 73a (abutting surfaces) facing to the position O, respectively. Mounting angles of the pillars 71, 72, and 73 are set in such a way that a moving range of the movable portion 40 can be regulated by bringing a part of the movable portion 40, to be described later, into the abutting surfaces 71a, 72a, and 73a.

Figure 5:
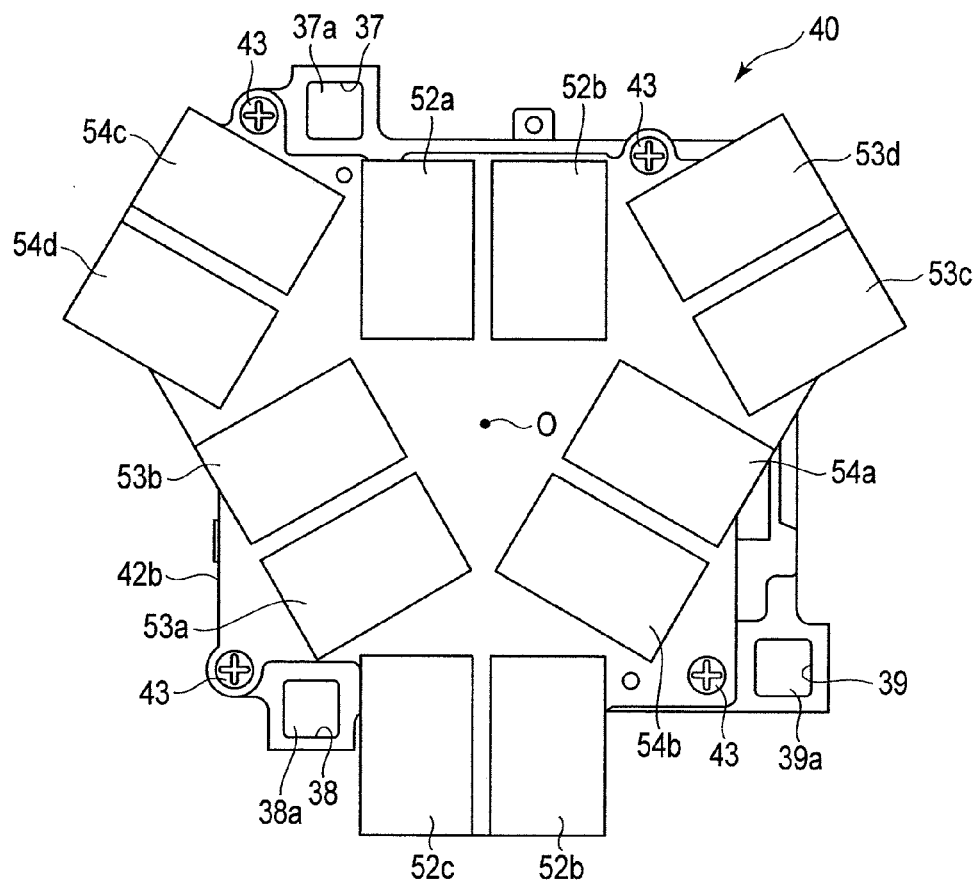
FIG. 5 is a rear view of the movable portion shown in FIG. 3 as viewed in the direction denoted by arrow F5.

As shown in FIG. 3, the movable portion 40 of the shake correction apparatus 100 includes a holder 41 made of, for example, an aluminum die casting, which is relatively lightweight and has some degree of rigidity. A plate-shaped yoke 42 made of steel is mounted on the rear of the holder 41. The yoke 42 is arranged along the X-Y plane. The yoke 42 includes three arm portions 421, 422, and 423 extending outward beyond the outer periphery of the holder 41. The arm portions 421, 422, and 423 include distal ends 421a, 422a, and 423a that abut on the abutting surfaces 71a, 72a, and 73a of the pillars 71, 72, and 73 of the stationary portion 20, respectively. FIG. 5 is a rear view of the movable portion 40 as viewed along the arrow F5 in FIG. 3. The yoke 42 is fastened and secured to boss portions 44 of the holder 41 by means of screws 43. That is, space S is provided between the holder 41 and the yoke 42.

Figure 6:
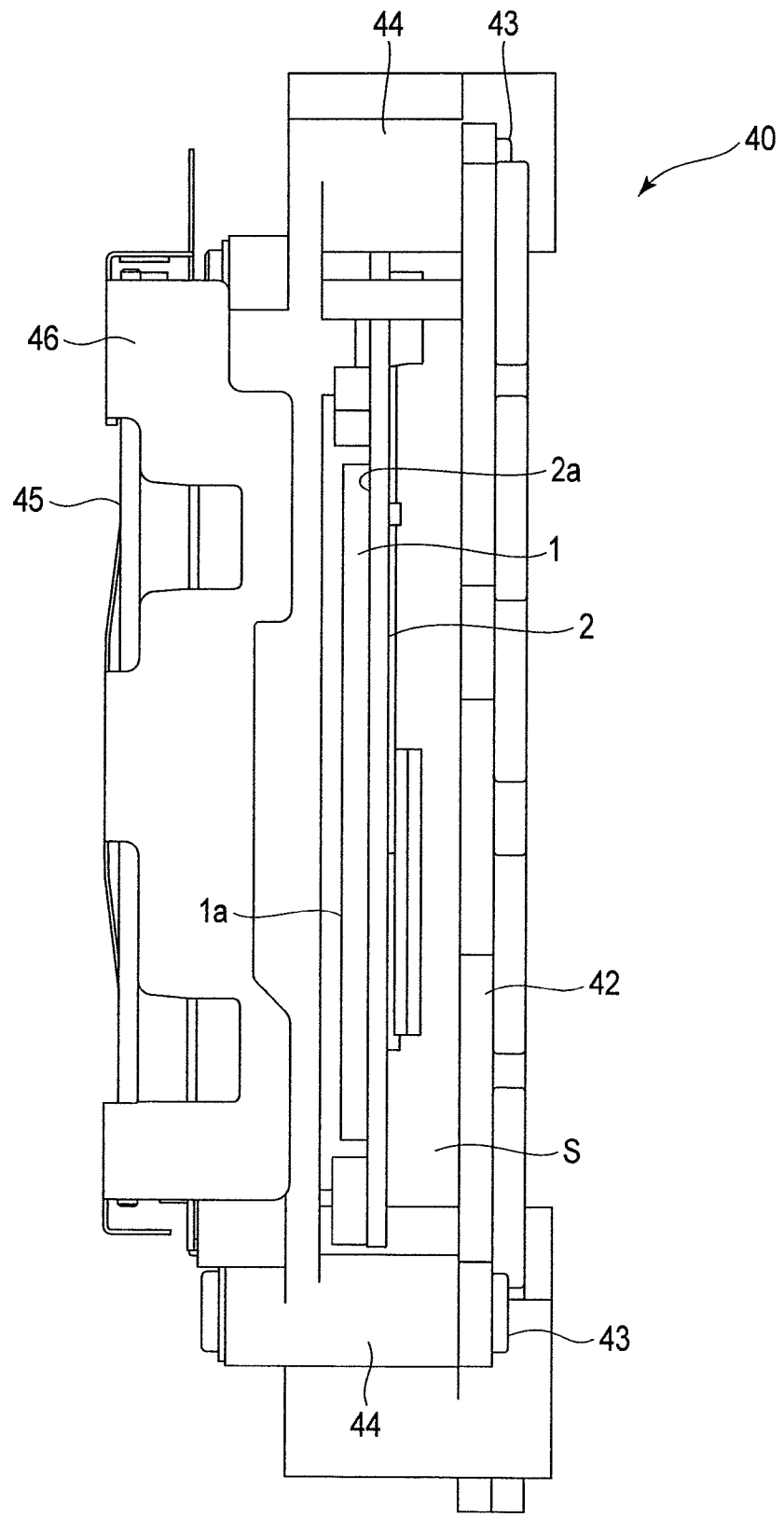
FIG. 6 is a side view of the movable portion shown in FIG. 3 as viewed in the direction denoted by arrow F6.

FIG. 6 is a side view of the movable portion 40 shown in FIG. 3 as viewed in the direction of the arrow F6. As shown in FIG. 6, a substrate 2 having the imaging element 1 installed in the front surface 2*a* is arranged in the space S between the holder 41 and the yoke 42. The substrate 2 is mounted from the rear of the holder 41 in such a position that the imaging element 1 is arranged in front of the substrate 2. That is, the substrate 2 is mounted on the holder 41 before the yoke 42 is mounted on the holder 41.

On the other hand, an ultrasonic filter 45 is mounted in front of the holder 41 by means of a filter frame 46. The holder 41 includes an opening, not shown, opposed to the imaging surface 1*a* of the imaging element 1. The ultrasonic filter 45 is mounted in a manner to cover this opening from the front. That is, the ultrasonic filter 45 is arranged in front of the imaging element 1 so that the ultrasonic filter 45 and the imaging element 1 are opposed to each other with a space therebetween.

As shown in FIG. 5, twelve magnets 52*a*, 52*b*, 52*c*, 52*d*, 53*a*, 53*b*, 53*c*, 53*d*, 54*a*, 54*b*, 54*c*, and 54*d* are glued and secured to a rear surface 42*b* of the yoke 42 by means of an adhesive, for example. These twelve magnets 52*a*-52*d*, 53*a*-53*d*, and 54*a*-54*d* are laid out to be opposed to the coils 22S, 22L, 23S, 23L, 24S, and 24L of the stationary portion 20, respectively. That is, the twelve magnets are arranged in a manner to radiate from the position O.

The magnets 52*a*-52*d*, 53*a*-53*d*, and 54*a*-54*d* are arranged in such a position that they at least partially overlap the imaging element 1 in the direction of the Z-axis. This enables size reduction of the movable portion 40 along the X-Y plane and achieves downsizing of an apparatus configuration. In this embodiment, a voice coil motor (VCM) is configured by assigning a pair of two magnets to a single coil. In two magnets assigned to each coil, the magnetic poles opposed to a coil are mutually different. Magnets in each pair are arranged to be opposed to each other along the X-Y plane.

By providing the movable portion 40 with the magnets 52*a*-52*d*, 53*a*-53*d*, and 54*a*-54*d*, the movable portion 40 is attracted to the base member 21 formed from a magnetic member. The three balls 31, 32, and 33 intervene between the movable portion 40 and the base member 21. In this manner, the movable portion 40 is attached to the base member 21 by the action of a magnetic spring due to magnetic forces of the magnets 52*a*-52*d*, 53*a*-53*d*, and 54*a*-54*d*. In this condition, the movable portion 40 can be moved along the X-Y plane. In order to prevent the spring force from becoming too strong at this time, for example, SUS304 is used as a base member. The lid member 60 bears a role in preventing the movable portion 40 from falling when, for example, a high impact is applied to the shake correction apparatus 100.

FIG. 7 shows a state where the coil pairs 22, 23, and 24 overlap the magnet groups 52 (52*a*-52*d*), 53 (53*a*-53*d*), and 54 (54*a*-54*d*). Specifically, the magnets 52*a* and 52*b* are assigned to the coil 22S. The magnets 52*c* and 52*d* are assigned to the coil 22L. The magnets 53*a* and 53*b* are assigned to the coil 23S. The magnets 53*c* and 53*d* are assigned to the coil 23L. The magnets 54*a* and 54*b* are assigned to the coil 24S. The magnets 54*c* and 54*d* are assigned to the coil 24L.

Assume that the focus is put on two pairs of magnets (for example, the magnets 52*a* and 52*b* and the magnets 53*c* and 53*d*) adjacent in an aerial circumferential direction with the position O as the center, as shown in FIG. 5. In this case, all the magnets are configured in a manner that one magnet in one pair and one magnet in the other pair are adjacent to each other and are made to have the same polarities. Specifically, the magnets 52*b* and 53*d* have the S-pole. The magnets 53*c* and 54*a* have the N-pole. The magnets 54*b* and 52*d* have the S-pole. The magnets 52*c* and 53*a* have the N-pole. The magnets 53*b* and 54*d* have the S-pole. The magnets 54*c* and 52*a* have the N-pole.

In this manner, two magnets (52*a* and 52*b*), which are assigned to a single coil (for example, 22S) and have different magnetic poles, are not subjected to the action of reverse magnetic flux from circumferentially-adjacent magnets (54*c* and 53*d*), respectively. Thus, adjacent magnets do not cancel each other's magnetic flux. Rather, by setting the same polarities to magnets in circumferentially-adjacent pairs, the effect of strengthening each other's magnetic flux can be expected.

The rear surface 42*b* of the yoke 42 is provided with three concave portions 37, 38, and 39 in a substantially rectangular shape, for housing and arranging therein the three balls 31, 32, and 33, respectively. These three concave portions 37, 38, and 39 are opposed to the concave portions 34, 35, and 36 of the base member 21, respectively. Ball receiving plates 37*a*, 38*a*, and 39*a* made of, for example, stainless steel are stuck on the bottom surfaces of the concave portions 37, 38, and 39, which come in slide-contact with the balls 31, 32, and 33.

FIG. 8 is a block diagram of a control system that controls operation of the shake correction apparatus 100 configured as described above. A shake detection portion 111 for detecting camera shake and the three Hall elements 25, 26, and 27 are connected to a control portion 110 (control means) of the shake correction apparatus 100. The six coils 22S, 22L, 23S, 23L, 24S, and 24L are also connected to the control portion 110. Energization of the six coils 22S, 22L, 23S, 23L, 24S, and 24L is controlled for each of the pairs of coils opposed to each other across the position O, that is, the coil pairs 22, 23, and 24.

Figure 9:
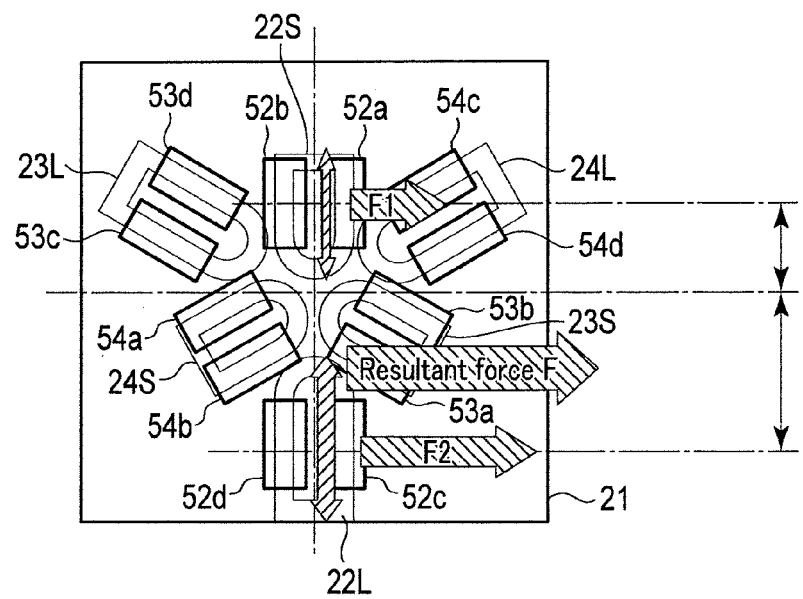
FIG. 9 is a view for illustrating operation of the shake correction apparatus shown in FIG. 1.
Figure 10:
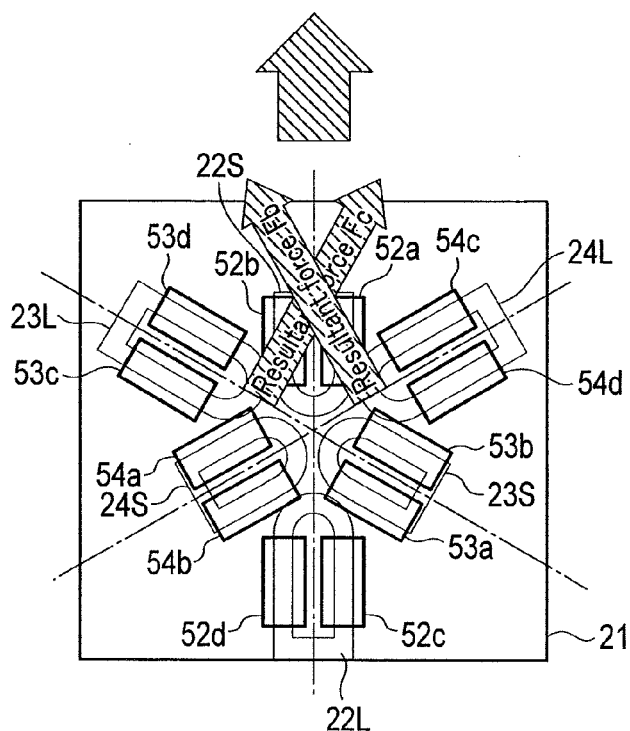
FIG. 10 is a view for illustrating operation of the shake correction apparatus shown in FIG. 1.
Figure 11:
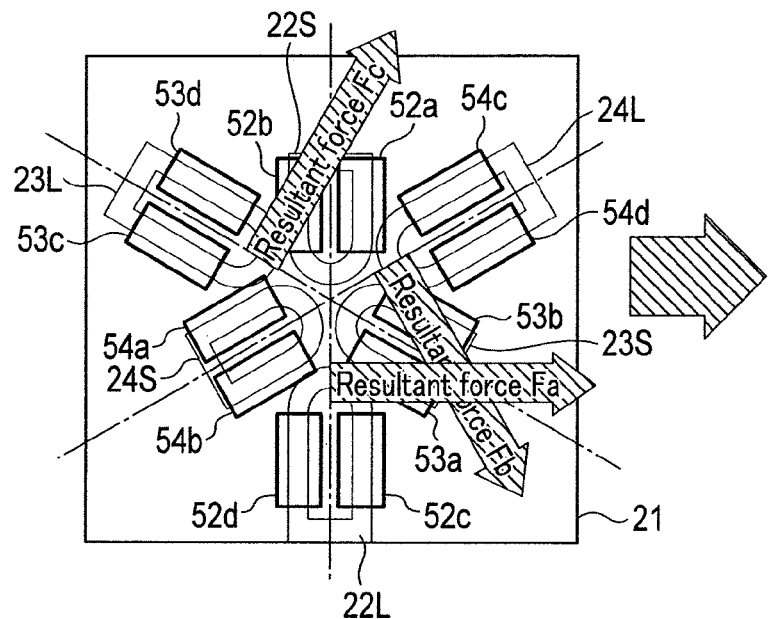
FIG. 11 is a view for illustrating operation of the shake correction apparatus shown in FIG. 1.

If shake is detected by means of the shake detection portion 111 while the camera is used, the control portion 110 feeds a controlling current to each of the coil pairs 22, 23, and 24 based on position information detected by the three Hall elements 25, 26, and 27. In this manner, camera shake is corrected. Hereinafter described in brief with reference to FIGS. 9 to 11 is a driving method of the movable portion 40 at the time of correcting shake.

In order to freely move the movable portion 40 along the X-Y plane, its driving mechanism is required to have three degrees of freedom in, for example, the direction along the X-axis, the direction along the Y-axis, and the direction of rotation. In this embodiment, the movable portion 40 is made movable in the direction of the X-axis, the direction of the Y-axis, and/or the direction of rotation by forming three pairs of VCMs from the combination of the three coil pairs 22 (22S and 22L), 23 (23S and 23L), and 24 (24S and 24L) and the three magnet groups 52 (52*a*, 52*b*, 52*c*, and 52*d*), 53 (53*a*, 53*b*, 53*c*, and 53*d*), and 54 (54*a*, 54*b*, 54*c*, and 54*d*).

Therefore, in this embodiment, the coils are each designed in a manner that one coil in each coil pair, i.e., the coils 22L, 23L, and 24L in the coil pairs 22, 23, and 24 have a greater driving force than the other coil, that is, the coils 22S, 23S, and 24S. In order to make a difference in driving force between two coils, possible approaches include making the two coils have different winding numbers, making the two coils have different sizes, making the two coils have different distances to a magnet, and making the two coils have different distances to the center of gravity of the movable portion 40. In this embodiment, a difference is given in driving force by making one coil in each pair, i.e., the coils 22L, 23L, and 24L, larger than other coils, i.e., the coils 22S, 23S, and 24S.

Other than the above, possible approaches for making a difference in driving force include making the magnets opposed to the coils have varied magnetic forces and making the magnets have varied sizes or thicknesses. Possible approaches further include varying the thickness or size of the yoke secured to two coils or corresponding magnets. In this embodiment, the shapes of the coils are varied, while all of the dimensions of the magnets are the same.

In the shake correction apparatus 100 configured as described above, for example, when the same currents are simultaneously flowed into the two coils 22S and 22L of the coil pair 22, as shown in FIG. 9, a force presented as vector F1 is exerted between the coil 22S and the magnets 52a and 52b, while a force presented as vector F2 is exerted between the coil 22L and the magnets 52c and 52d. At this time, the vector F2 is greater than the vector F1 since the coil 22L is larger than the coil 22S. Vector F presenting a resultant force of the two vectors F1 and F2 is deviated from the position O to the coil 22L, thereby causing the driving force in the rotation direction with the position O as the center.

If the movable portion 40 is driven by preparing three coil pairs each containing two coils made different in driving force, the movable portion 40 can be moved along the X-Y plane by synthesizing the driving forces of the vector F caused by the coil pairs 22, 23, and 24.

For example, in the case of moving the movable portion 40 in the forward direction (the upper side in the drawings) along the Y-axis, as shown in FIG. 10, currents are flowed into the two coils 23S and 23L of the coil pair 23 and at the same time, currents of the same size are flowed into the two coils 24S and 24L of the coil pair 24 so that a resultant force of two vectors is exerted on the movable portion 40. In the case of moving the movable portion 40 in the reverse direction along the Y-axis, the direction of currents flowed into the coil pairs 23 and 24 may be reversed.

In the case of moving the movable portion 40 in the forward direction (the right side in the drawings) along the X-axis, as shown in FIG. 11, a current of a predetermined direction and size is flowed into each of the coil pairs 22, 23, and 24 so that a resultant force of three vectors is exerted on the movable portion 40.

In the case of rotating the movable portion 40, the same currents may be flowed into the coil pairs 22, 23, and 24 in a manner to exert forces in the same direction as the rotation direction. In other words, a current of such size and direction that enables the movable portion 40 to be moved in a desired direction may be flowed into each coil pair. In this case also, if it is desired to move the movable portion 40 in the reverse direction, the direction of currents flowed into all the coils may be reversed.

At this time, feedback control is performed to provide feedback by constantly checking a present position by means of the Hall elements 25, 26, and 27 so that the movable portion 40 is moved in a correct position. In the case where the coils and the Hall elements are arranged as in the above case, the coils and the Hall elements are not in one-to-one correspondence. It is necessary to calculate output results of the three Hall elements 25, 26, and 27 in order to determine a direction along the X-axis, a direction along the Y-axis, and a rotation position of the movable portion 40, and based on the determined directions and position, to flow a current in a manner that the movable portion 40 is moved again in the predetermined direction along the X-axis, the direction along the Y-axis, and in the rotation position.

As described above, according to this embodiment, the three coil pairs 22, 23, and 24 are laid out close to the position O on the stationary portion 20 in a manner to be opposed to the movable portion 40 that holds the imaging element 1 while the magnets 52a-52d, 53a-53d, and 54a-54d are arranged in a manner to overlap the imaging element 1 in the direction of the Z-axis. This achieves downsizing of an apparatus configuration along the X-Y plane.

According to this embodiment, among the coil pairs 22, 23, and 24 each including two coils, the Hall elements 25, 26, and 27 are provided in the smaller coils 22S, 23S, and 24S. This achieves reduction of noise in signals detected by the Hall elements, enables accurate detection of a position, and ensures improved servo performance.

The embodiment has been described, but the present invention is in no way limited to this embodiment. Various modifications or applications of the present invention are, of course, possible, without departing from the spirit and scope of the invention. In the embodiment described above, for example, the case of providing the three coil pairs 22, 23, and 24 is described. However, four or more coil pairs may be formed.

In addition, a member to be driven to correct shake may be an optical element, not an imaging element.

Figure 12:
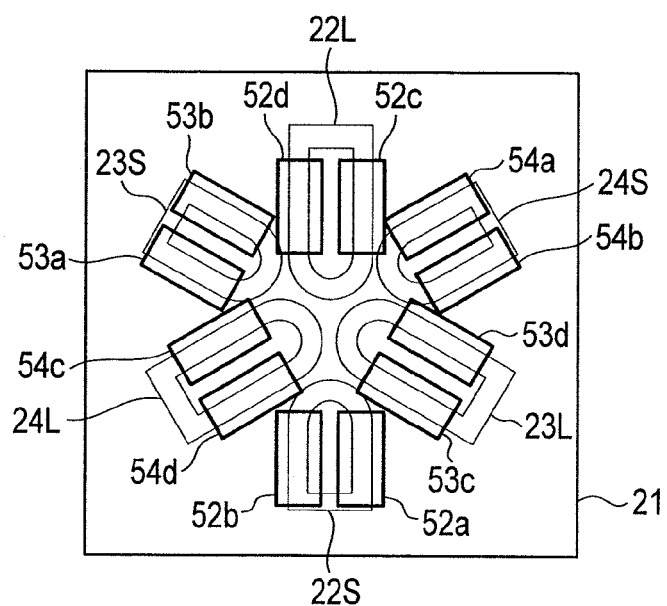
FIG. 12 is a schematic diagram showing substantial parts of a shake correction apparatus according to another embodiment of the present invention.

According to the shape described in the above embodiment, the coils 22L, 23L, and 24L are protruding to outside. However, an apparatus can be reduced in size by making these coils have different driving forces as shown in FIG. 12, instead of making them protrude. In such a case, the coils 22L, 23L, and 24L may be made larger in winding number than the coils 22S, 23S, and 24S while the magnets 52c, 52d, 53c, 53d, 54c, and 54d may be greater in thickness than the magnets 52a, 52b, 53a, 53b, 54a, and 54b.

The invention claimed is:

1. A shake correction apparatus comprising:
   a stationary portion on which a plurality of coils are arranged;
   a movable portion that includes a plurality of magnets arranged to be opposed to the coils, and an optical element or an imaging element;
   a supporting member for movably supporting the movable portion with respect to the stationary portion along a plane orthogonal to an optical axis of light entering into the optical element or the imaging element;
   detection means for detecting a position of the movable portion; and
   control means for controlling a current to be flowed into the coils based on an output of the detection means,
   wherein the coils include at least three coil pairs when two coils that are arranged to be opposed to each other along the plane orthogonal to the optical axis are paired as one coil pair, and
   wherein in each of the coil pairs, driving forces of two coils forming each of the coil pairs are different from each other.

2. The shake correction apparatus according to claim 1, wherein the detection means is arranged on an inside of one coil that is smaller in driving force than another coil of the two coils forming each of the at least three coil pairs.

3. The shake correction apparatus according to claim 1,
   wherein a predetermined position of the stationary portion is located between the two coils forming each of the coil pairs, and
   wherein the coils are arranged in a manner to radiate from the predetermined position as a center.

4. The shake correction apparatus according to claim 3,
wherein in the at least three coil pairs, ends of coils on a side of the predetermined position of the stationary portion are bent in an arc shape, and
wherein the ends in the arc shape face each other.

5. The shake correction apparatus according to claim 1,
wherein each of the coils is assigned with two opposed magnets, and
wherein the two magnets are arranged to face each other along the plane orthogonal to the optical axis.

6. The shake correction apparatus according to claim 1, further comprising a lid member that is attached to the stationary portion and is arranged in such a position that the movable portion is pinched between the lid member and the stationary portion,
wherein the stationary portion is formed from a magnetic member, and
wherein the movable portion is attached to the stationary portion by magnetic forces of the magnets through the supporting member.

7. The shake correction apparatus according to claim 6, further comprising a plurality of pillars that attach the lid member to the stationary portion outside a moving region of the movable portion,
wherein each of the pillars includes an abutting surface that defines the moving region of the movable portion by bring the movable portion in abutment.

8. The shake correction apparatus according to claim 1,
wherein the movable portion is provided with the imaging element, and
wherein the imaging element is attached to the movable portion in a manner wherein at least a part of the magnets overlaps the imaging element in a direction of an optical axis of light entering into the imaging element.

* * * * *